United States Patent [19]

Nowak et al.

[11] 4,278,923

[45] Jul. 14, 1981

[54] APPARATUS FOR MAINTAINING A ROTATING MEMBER AT A CONSTANT SPEED

[76] Inventors: Peter Nowak, Am Weinberg 1, 7634 Kippenheim 2; Reinhard Rieger, Bertholdstrasse 29, 7630 Lahr, both of Fed. Rep. of Germany

[21] Appl. No.: 924,207

[22] Filed: Jul. 12, 1978

[30] Foreign Application Priority Data

Jul. 13, 1977 [DE] Fed. Rep. of Germany ....... 2731666

[51] Int. Cl.³ .............................................. H02P 5/46
[52] U.S. Cl. .................................... 318/302; 318/311; 318/326; 74/859; 74/866; 369/241; 369/266
[58] Field of Search ................... 318/52, 66, 268, 301, 318/302, 306, 307, 309, 310, 311, 312, 317, 332, 326, 328, 329; 74/857, 859, 866; 274/1 E, 39 A

[56] References Cited

U.S. PATENT DOCUMENTS

| 3,586,949 | 6/1971 | Spear et al. | 318/326 |
|---|---|---|---|
| 3,673,400 | 6/1972 | Ito | 74/866 |
| 3,716,772 | 2/1973 | Larson | 318/332 |
| 3,913,419 | 10/1975 | Sale et al. | 74/857 |
| 3,935,520 | 1/1976 | Johnson | 318/326 |
| 3,939,738 | 2/1976 | Adey et al. | 74/866 |
| 3,983,464 | 9/1976 | Peterson | 318/328 |
| 4,099,107 | 7/1978 | Eder | 318/60 |
| 4,152,632 | 5/1979 | Peterson | 318/317 |

*Primary Examiner*—J. V. Truhe
*Assistant Examiner*—John W. Redman
*Attorney, Agent, or Firm*—Fleit & Jacobson

[57] ABSTRACT

An assembly comprising a drive motor connected to a member to be rotated by a transmission means which is liable to slip when the rotating member is subjected to a loading thereon, includes a compensation circuit connected to the motor control circuit and operable to apply to the latter a compensation signal proportional to the change in a parameter directly related to the motor torque, thereby to compensate for slipping of the transmission means.

23 Claims, 2 Drawing Figures

APPARATUS FOR MAINTAINING A ROTATING MEMBER AT A CONSTANT SPEED

BACKGROUND OF THE INVENTION

It is known that a rotating member, such as a phonograph turntable, driven by an electric motor by way of a transmission means or coupling member which may be subject to slip because it does not provide a fully positive transmission of the drive force, for example a rubber belt or a friction drive wheel, tends to suffer from a drop in its speed of rotation, when subjected to a loading, in relation to its operating condition when the rotating member is not loaded or in relation to the speed of rotation of the motor, which is assumed to be at least substantially constant. This fall in rotary speed, which is produced by the load on the rotating member causing the transmission means to slip, while the speed of rotation of the motor remains constant, is a phenomenon encountered with any transmission means which is liable to slip, and the slippage is dependent on the load on the rotating member, although on the nature of the transmission means coupling the drive motor to the rotating member. It is thus found that the degree of slip suffered by the transmission means increases in proportion to the increase in the loading on the rotating member. The result of this slip, when it occurs, is that the ratio between the speed of rotation of the driven rotating member and the speed of the drive motor is reduced.

It will be appreciated that this phenomenon is undesirable in many cases of practical operations, more particularly for example when the speed of rotation of the rotating member is required to remain within close limits, as in the case of the turntable of a phonograph or gramophone, or a capstan in a magnetic tape device, for example a tape recorder and/or reproducer. However in many cases it is essential that the transmission means or coupling member between the drive motor and the rotating member driven thereby is resilient, with the result that the transmission is inherently liable to suffer from slip when the rotating member is loaded. Consequently serious difficulties are encountered in attempting to maintain a constant speed of rotation of the rotating member when the rotating member is subjected to varying loadings, while the speed of rotation of the motor driving the rotating member remains constant. To revert to the above-stated example of a belt-driven phonograph turntable, a fluctuating turntable loading will usually occur when for example a disc cleaning device is laid on or removed from the disc on the turntable. In this case, the loading on and thus the speed of rotation of the turntable will vary resulting in poor sound reproduction.

SUMMARY OF THE INVENTION

An object of the present invention is to overcome the above-indicated disadvantages of apparatus in which the drive to a rotary member by a transmission means which is liable to suffer from slip results in fluctuation in the speed of rotation of the rotary member, in spite of the motor rotating at a substantially constant speed.

It is another object of the invention to provide apparatus and a process for maintaining a constant speed of rotation of a rotary member by a motor by way of a transmission means or coupling member which is liable to slip.

Yet another object of the invention is to provide apparatus for maintaining at a constant value the speed of rotation of a tape capstan or phonograph turntable which is driven by a transmission means liable to suffer slip, in spite of such slippage occurring.

A still further object of the invention is to provide a process and apparatus for maintaining at a substantially constant value the speed of rotation of a rotary member driven by way of a transmission means which is liable to suffer slip, by acting on the control or regulation circuit which is operable to control the speed of motor rotation.

These and other objects of the invention are achieved by the provision of a compensation circuit for producing a signal which is applied to the motor control circuit to compensate for the slip suffered by the transmission means or coupling member, the compensation signal being proportional to the change in an operating parameter which is in direct relationship with the motor drive moment of the motor.

In order to avoid oscillation in the system, which could be caused for example by excessively severe compensation, or over-compensation, the compensation circuit which produces the aforesaid compensation signal may be limited in respect of its action.

The operating parameter of the motor, directly related to the motor torque, may be the motor current, for example in the case of a controlled direct-current motor, and an indicating-detecting means for detecting and indicating the motor torque may be connected into the motor current flow path. This indicating means may be in the form of a current source which is connected into the control circuit at a position therein such as to influence a comparison means in the circuit. In such an embodiment, the motor control or regulation circuit desirably has a comparison circuit means for comparing the actual speed of rotation of the motor to a desired value of that speed, and the compensation signal may influence or falsify either the actual value or the desired value of the speed of motor rotation in order thereby to compensate for slip in the transmission. In such a case, the actual value of the motor speed may be influenced by the compensation circuit such that the actual value is reduced with respect to that value which corresponds to the true speed at which the motor is rotating at that time.

The compensation signal advantageously has a time constant which is greater than the time constant of the motor control circuit, so that oscillations in the system or the control action are thereby additionally suppressed.

Among the advantages of the invention, besides providing for compensation of the slip suffered by the transmission means or coupling member, is that the danger of oscillations in the control circuit is substantially eliminated. Furthermore, with apparatus of the invention, the actual value of the speed of motor rotation is not obtained from the speed of rotation of the rotary member which is being driven by the motor, but is derived directly from the motor driving the rotary member. In the result, the slip compensation action is derived from an electrical parameter of the motor, which is directly related to the motor torque, and this therefore provides an indication concerning the condition of loading on the motor and the general assembly.

It might be said therefore that the invention recognises firstly that the degree of slip suffered by the transmission means will vary according to the loading on the rotary member driven thereby, and that secondly, when the rotary member is subjected to such a loading, there also occurs a change in one or more electrical parameters, such as the motor current, of the motor driving the rotary member; this parameter change is now employed to provide a criterion to determine compensation for slip, whereby the rotary member can be maintained at a constant speed of rotation.

DESCRIPTION OF THE PREFERRED EMBODIMENTS

Figure 1:
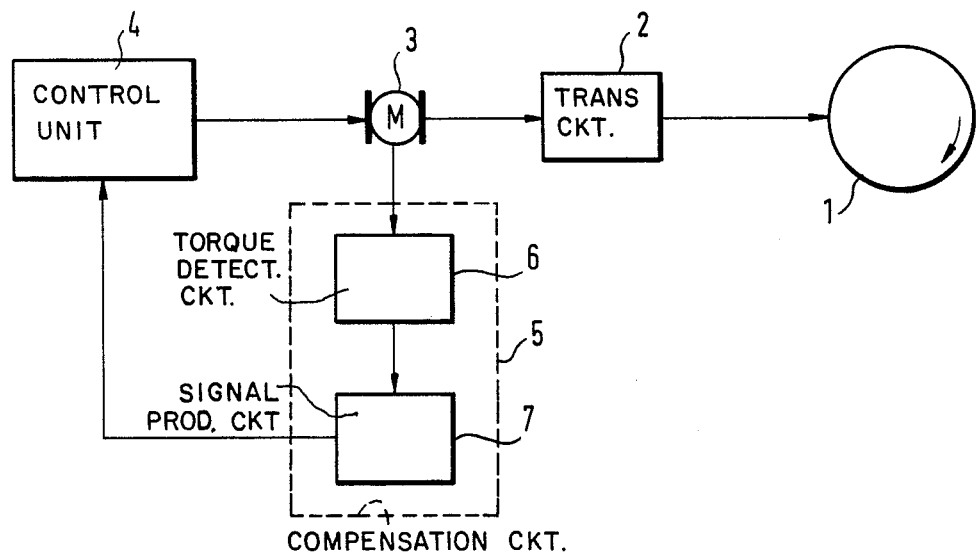
FIG. 1 shows a block circuit diagram of an assembly including a compensation circuit for compensating for slip in transmission means between a drive motor and a rotary member driven thereby.

Reference is first made to FIG. 1 showing a member 1 which is to be driven in rotation, for example a turntable of a phonograph or gramophone or a capstan flywheel of a magnetic tape device, such as a tape recorder and/or reproducer. The member 1 is driven by a motor 3 such as a controlled direct-current motor. The motor 3 is drivingly connected to the member 1 for rotation thereof by a coupling member or transmission means diagrammatically indicated at 2. The transmission means 2 is of a nature such that it may suffer from slip in the transmission of the drive force from the motor 3 to the member 1, for example it may be a drive belt or a friction drive wheel. It will be appreciated that such a transmission does not provide for a positive transmission of drive as would otherwise be provided for example by a gear train. Reference numeral 4 denotes an electronic control unit or circuit connected to the motor 3 for controlling same, and while reference numeral 5 denotes a compensation circuit which is connected to the motor 3, for example being connected into the motor current flow path, and to the unit 4. The compensation circuit 5 comprises means 6 for detecting the motor torque, and a signal-producing means 7 connected to the output of the means 6.

The means 6 delivers an output signal to the means 7 in dependence on a change in the load on the rotary member 1, such a change in load resulting in a change in the motor 3 torque; the signal applied to the means 7 is thus proportional to the motor torque. The signal formed in the means 7 is applied to the unit 4 which thus operates to hold the motor 3 at the respective speed of rotation required.

Thus, when the rotary member 1 is subjected to a higher loading, a higher level of drive torque is required from the motor 3, by way of the transmission means 2. This higher torque value is detected by the means 6 and is processed in the circuit 5, as briefly described hereinbefore, and passed to the unit 4. The signal applied to the unit 4 there influences the actual value of the speed of motor rotation, or the desired value of that speed. The unit 4 also includes a comparison circuit (not shown in FIG. 1) which compares the actual value and the desired value to each other, and then controls the motor 3 accordingly, so that the speed of rotation of the motor 3 is raised to a higher value such that the rotary member 1 is held at a constant speed of rotation, taking into account the slip being suffered by the transmission means 2.

In this respect, the invention makes use of the phenomenon that the degree of slip in the transmission of the drive force is directly related to the torque required from the motor 3.

Figure 2:
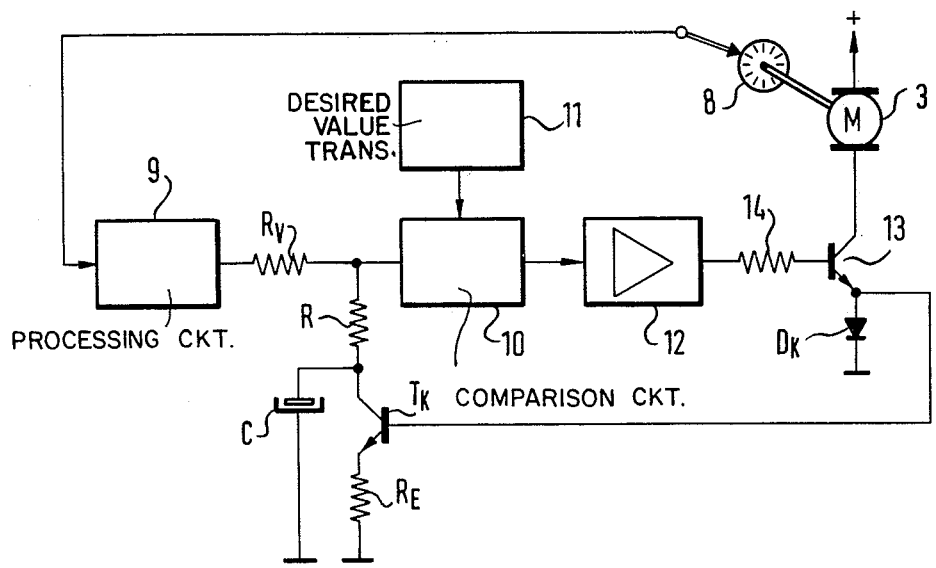
FIG. 2 shows a block circuit diagram of a control circuit of the FIG. 1 assembly and details of a slip compensation circuit.

Attention is now directed to FIG. 2 which shows in greater detail the block diagram of the unit 4 for motor control in the FIG. 1 circuitry, and detail of the compensation circuit which is connected to the unit 4 circuit at a position at the comparison means in the electronic unit 4, thereby to influence the actual value of the speed of motor rotation.

The FIG. 2 circuit shown includes a motor speed detector such as a tachogenerator 8 which is driven by the motor 3. A processing circuit 9 is connected to the output of the tachogenerator 8, while the output of the circuit 9 is connected to an input of a comparison circuit 10 by way of a resistor $R_V$. A desired value transmitter 11 for setting a desired value in respect of the speed of motor rotation is connected to another input of the comparison circuit 10. The output of the comparison circuit 10 is connected to the input of an amplifier 12 whose output is in turn connected by way of a resistor 14 to the base of a power transistor 13 which acts as the final control stage in the flow of drive power to the motor 3.

The compensation circuit (5 in FIG. 1) for compensating for slip suffered by the transmission means 2 between the motor 3 and the rotary member 1 in FIG. 1 includes, in FIG. 2, a diode $D_K$ which is connected to the emitter of the power transistor 13 and which, together with a transistor $T_K$ whose base is also connected to the emitter of the power transistor 13, forms a current mirror for reflecting the current flow through the motor 3. The collector of the transistor $T_K$ is connected to the input of the comparison means 10 by way of a resistor R which, in conjunction with a capacitor C, forms a timing means. A resistor $R_E$ is connected as shown to the emitter of the transistor $T_K$.

The above-described apparatus operates as follows:

When the rotary member is subjected to a loading, a braking or retardation force is applied to the motor 3 by way of the transmission means 2, and the speed of rotation of the motor 3 drops. This fall in the speed of motor rotation is also imparted to the tachogenerator 8, as the tachogenerator 8 is rigidly connected to the motor drive shaft. The information that the speed of motor rotation has dropped, in the form of a signal proportional to the speed of motor rotation, is passed by the tachogenerator 8 to the control unit 4, more particularly to the circuit 8 which thus processes the signal from the tachogenerator 8. For example, the processing circuit 9 could be an integrated revolution control switch IS TCA 955 manufactured and sold by Siemens AG, and disclosed in the publication of Alfred Hauenstein entitled "Integrierte Drehzahlregelschaltung TCA 955". The output signal from the circuit 9 is applied to the comparison circuit 10 in which it is compared to the desired value of motor speed from the transmitter 11. By virtue of such comparison the change in the speed of rotation of the motor 3 is ascertained. The final stage (including the transistor 13), of the electrical motor drive chain is adjusted suitably so that more current or more power is fed to the motor 3. In this way the speed of rotation of the motor is increased back up to its original actual value, so as again to correspond to the desired value of motor speed.

However, in order still to take account of slip suffered by the transmission means 2 due to the increased load on the member 1, the apparatus includes the compensation circuit 5 (see FIG. 1) of which an embodiment is illustrated in greater detail in FIG. 2. The compensation circuit 5 detects the condition of loading on the assembly, by virtue of the torque indicating-detecting means 6 disposed in the motor current flow path. The loading condition is thereby transmitted to the motor control circuit. The compensation circuit 5 operates as a current source which introduces current into the control circuit at the position of the comparison circuit 10 thereby to influence therein the 'nominal' or 'assumed' actual value of motor speed, in such a way that that actual value, as contained in the circuit, is in fact equivalent to a lower speed than the speed at which the motor is in truth rotating at that time. Accordingly, the control assembly attempts to change this condition and to raise the speed of rotation of the motor to the speed which is assumed to be correct, by supplying even more power or current to the motor. This therefore provides for compensation of the slip suffered by the transmission means 2. In other words, the compensation circuit falsifies the motor speed in the circuitry, in order to induce the circuitry to increase the motor speed to compensate for slip.

As already mentioned, the diode $D_K$ in conjunction with the transistor $T_K$ forms a current reflecting means or feedback-action means; and the current flowing through the transistor $T_K$ accordingly follows the behaviour of the motor current of the drive motor. The collector current of the transistor $T_K$ is such that a voltage drop occurs at the resistor $R_V$, and this increases the speed of rotation of the motor 3 by the factor of the slip suffered by the transmission means 2, by the action of the comparison circuit 10 and the power transistor 13. The slip suffered by the transmission means 2 in the loaded condition of the drive assembly 1 may be readily determined empirically for the respective rotary member 1 and the transmission means 2 used in the drive assembly.

Overcompensation or undercompensation may be achieved by suitable dimensioning of the resistor $R_E$ or the control ratio of the control means $D_K$, $T_K$, R. The period of operation of the compensation circuit 10 is determined by means of the timing means R,C in order to limit the action of the circuit 10 and therefore to prevent oscillation of the control assembly. For this purpose the time constant of the timing means formed by resistor R and capacitor C should be made greater than the time constant of the control assembly.

It will be fully appreciated that the above-described apparatus and process are given by way of example only of the invention, and that many modifications may be made without thereby departing from the spirit and scope of the invention.

We claim:

1. In an assembly comprising a drive motor producing a drive force and a corresponding motor torque, a rotary member, transmission means for operatively connecting the motor and the rotary member and being of a nature to be liable to suffer from slip in the transmission of the drive force, and an electrical control circuit connected to said drive motor for controlling the drive motor; the improvement comprising compensation means responsive to said slip in the transmission of the drive force for applying to the control circuit a compensation signal proportional to a change in a parameter directly related to the motor torque, whereby to compensate for the slip suffered by the transmission means.

2. In the assembly as set forth in claim 1, including limiting means for limiting the action of the compensation means, whereby to prevent oscillation of the system.

3. In the assembly as set forth in claim 1, wherein said parameter is the motor current.

4. In the assembly as set forth in claim 1, wherein said motor produces motor current flowing in a motor current flow path, further comprising torque detector means connected into the motor current flow path for detecting said motor torque.

5. In the assembly as set forth in claim 1, wherein said control circuit includes a comparison circuit, and wherein said compensation means comprises a current source which is connected to said comparison circuit.

6. In the assembly as set forth in claim 5, wherein said comparison circuit is operable to compare an actual value of the speed of rotation of the motor to a desired value of the speed of rotation of the motor.

7. In the assembly as set forth in claim 6, wherein said compensation means is operable to alter said actual value of the speed of rotation of the motor.

8. In the assembly as set forth in claim 6, wherein said compensation means is operable to alter said desired value of the speed of rotation of the motor.

9. In the assembly as set forth in claim 7, wherein said compensation means is operable to reduce the actual value of the speed of rotation of the motor relative to the true value of the speed of rotation of the motor.

10. In the assembly as set forth in claim 1, wherein said control circuit has a time constant, and wherein said compensation means includes means for providing a time constant greater than the time constant of the control circuit.

11. In the assembly as set forth in claim 1, wherein the compensation means includes a current mirror for reflecting the motor current.

12. A process of maintaining, at a substantially constant value, the speed of rotation of a rotary member driven by a motor by way of a transmission means which is liable to slip, comprising the steps of providing an electrical control circuit connected to the motor for controlling the motor, and applying to the control circuit a compensation signal which is proportional to the change in a parameter directly related to the motor torque, whereby to compensate for said slip suffered by the transmission means.

13. An assembly comprising:
an electric drive motor having a motor speed and producing a drive force;
a rotatably mounted member;
transmission means for operatively connecting the drive motor to the rotatably mounted member, the transmission means being liable to suffer slip, in transmitting the drive force from the drive motor to the rotatably mounted member, when the rotatably mounted member is subjected to a loading thereon;
a control circuit operable to control the motor speed; and
a compensation circuit connected to the control circuit and operable to apply thereto a compensation signal proportional to the change in a parameter directly related to the motor torque.

14. The assembly of claim 13, including limiting means for limiting the action of the compensation circuit, whereby to prevent oscillation of the system.

15. The assembly of claim 13, wherein said parameter is the motor current.

16. The assembly of claim 13, wherein said motor produces motor current flowing in motor current flow path, further comprising torque detector means connected into the motor current flow path for detecting said motor torque.

17. The assembly of claim 13, wherein said control circuit includes a comparison circuit, and wherein said compensation means comprises a current source which is connected to said comparison circuit.

18. The assembly of claim 17, wherein said comparison circuit is operable to compare an actual value of the speed of rotation of the motor to a desired value of the speed of rotation of the motor.

19. The assembly of claim 18, wherein said compensation circuit is operable to alter said actual value of the speed of rotation of the motor.

20. The assembly of claim 19, wherein said compensation circuit is operable to reduce the actual value of the speed of rotation of the motor relative to the true value of the speed of rotation of the motor.

21. The assembly of claim 18, wherein said compensation circuit is operable to alter said desired value of the speed of rotation of the motor.

22. The assembly of claim 13, wherein said control circuit has a time constant, and wherein said compensation circuit includes means for providing a time constant greater than the time constant of the control circuit.

23. An assembly of claim 13, wherein the compensation circuit includes a current mirror for reflecting the motor current.

* * * * *